United States Patent
Hawkins et al.

(10) Patent No.: US 11,921,709 B2
(45) Date of Patent: Mar. 5, 2024

(54) UNIFORM ACCESS TO DIVERSE STRUCTURED INFORMATION FOR CLIENT APPLICATIONS

(71) Applicant: VMware LLC, Palo Alto, CA (US)

(72) Inventors: Siavash James Joorabchian Hawkins, Tonbridge (GB); Lorenzo Blasa, Staines-Upon-Thames (GB); Phillip Riscombe-Burton, Staines-Upon-Thames (GB); Simon Brooks, Palo Alto, CA (US); Neil Broadbent, Staines-Upon-Thames (GB)

(73) Assignee: VMware, Inc., Palo Alto, CA (US)

( * ) Notice: Subject to any disclaimer, the term of this patent is extended or adjusted under 35 U.S.C. 154(b) by 43 days.

(21) Appl. No.: 16/738,260

(22) Filed: Jan. 9, 2020

(65) Prior Publication Data

US 2021/0216539 A1     Jul. 15, 2021

(51) Int. Cl.
*G06F 16/242* (2019.01)
(52) U.S. Cl.
CPC .............................. *G06F 16/2423* (2019.01)
(58) Field of Classification Search
None
See application file for complete search history.

(56) References Cited

U.S. PATENT DOCUMENTS

| | | | |
|---|---|---|---|
| 7,685,412 B1 * | 3/2010 | Burdick | G06F 9/44505 713/1 |
| 8,972,533 B1 * | 3/2015 | Roka | H04N 21/8186 709/221 |
| 9,906,398 B1 * | 2/2018 | Passaglia | H04L 41/0816 |
| 2002/0071545 A1 * | 6/2002 | Burns | H04M 1/2478 379/368 |
| 2004/0267764 A1 * | 12/2004 | Rothman | G06F 40/154 707/999.102 |
| 2007/0202924 A1 * | 8/2007 | Lai | H04M 3/42153 455/566 |
| 2008/0046692 A1 * | 2/2008 | Michalak | G06F 9/30145 712/E9.05 |

(Continued)

FOREIGN PATENT DOCUMENTS

| | | | |
|---|---|---|---|
| CN | 101102230 A | * | 1/2008 |
| CN | 101662527 B | * | 12/2012 |

*Primary Examiner* — Augustine K. Obisesan
(74) *Attorney, Agent, or Firm* — King Intellectual Asset Management

(57) ABSTRACT

Disclosed are various examples for an application settings module that provides uniform access to diverse types of data, such as mobile device settings. A client device, such as a mobile device, can be configured through execution of program instructions to access a schema file comprising a definition of a plurality of keypaths, where individual ones of the plurality of keypaths uniquely correspond to one of a plurality of device settings and the keypaths are defined in the schema file in association with a plurality of methods. The client device can identify a function invoked using one of the keypaths to read or write a corresponding one of the device settings, whether stored locally or remote, and, in response to the function being invoked, execute a portion of the methods corresponding to the one of the keypaths in the schema file and return a result to a requesting process.

20 Claims, 6 Drawing Sheets

(56) References Cited

U.S. PATENT DOCUMENTS

| | | | |
|---|---|---|---|
| 2011/0004622 A1* | 1/2011 | Marson | G06Q 10/06 |
| | | | 707/770 |
| 2012/0197972 A1* | 8/2012 | Tukol | G06F 9/4416 |
| | | | 709/203 |
| 2013/0198569 A1* | 8/2013 | Eidelman | G06F 11/2268 |
| | | | 714/32 |
| 2013/0311913 A1* | 11/2013 | McCoy | G06F 9/451 |
| | | | 715/762 |
| 2015/0019991 A1* | 1/2015 | Kristj nsson | H04L 41/0853 |
| | | | 715/747 |
| 2015/0121351 A1* | 4/2015 | Cabrera | G06F 9/44505 |
| | | | 717/141 |
| 2020/0204693 A1* | 6/2020 | Zhang | G06F 3/1205 |
| 2021/0141648 A1* | 5/2021 | Halim | H04L 41/085 |

* cited by examiner

UNIFORM ACCESS TO DIVERSE STRUCTURED INFORMATION FOR CLIENT APPLICATIONS

BACKGROUND

Applications running on mobile and personal computing devices, such as smartphones and tablets, have access to a wide and diverse range of structured information. For instance, some operating systems provide access to the structured information using a number of different programming interfaces depending on the type of information being stored or accessed. Software developers thus have to learn, consult with, and use multiple types of interfaces depending on which information their software will access. Software developers must also write and maintain specific code for each of these interface types.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
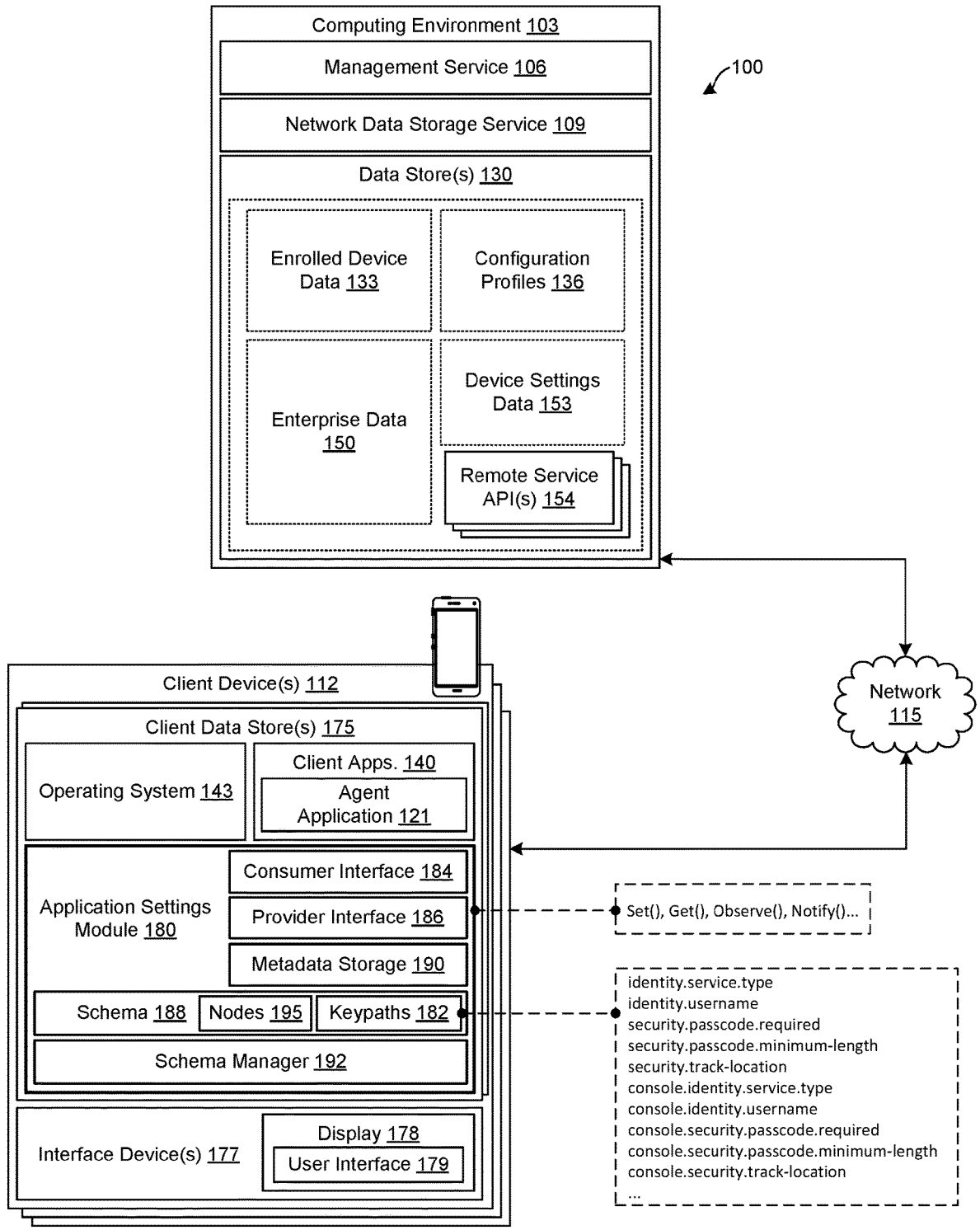
FIG. 1 is a drawing of an example of a networked environment including a client device having an application settings module thereon.

The present disclosure describes an application settings module that provides uniform access to diverse structured information for mobile applications and other client applications. Most computer applications and program support or require configurations, user preferences, authentication credentials, or other type of settings stored by a client device, such as a personal computer, a smartphone, or other device. Specifically, various computer applications handle multiple types of small-volume settings data, such as device configurations, preferences, and credentials. Some examples of settings data that are utilized by applications include preferences selected by an end user; policy restrictions from an enterprise associated with the end user; policy restrictions from a service utilized by the end user, such as a third-party email service; credentials provided by the end user; credentials supplied to the end user by the enterprise or by a third-party service; configuration settings for services accessed by the application; device information, such as the operating system build and version; device status, such as a wireless fidelity (Wi-Fi) connection state; and so forth.

As can be appreciated, different settings have different sources. For instance, preferences specified by an end user can be accessed from a user interface for a client application; policy restrictions can be received from an enterprise management console; configurations can be retrieved from a remote service; device information and device states can be accessed locally on a client device; and so forth.

Even further, different settings can also be stored in different locations and formats, such as storage as key-value pairs in a flat file database; encrypted data in a structured query language (SQL) database; data stored in hardware-backed local storage, such as the iOS® keychain or other operating system keychain; or other data store residing in memory. Each of these storage locations and formats are read or written using differing application programming interfaces (APIs). In other words, settings with different types, sources, locations, formats, or controls must be accessed through vastly different application programming interfaces.

Modules, libraries, and services that make up a computer application typically come from a number of developer teams, some originating inside a same organization and others from third party library vendors or open source projects. Any module, library, or service can require access to device settings, for example, to configure an application or the device, perform authentication, or other purpose as can be appreciated. However, it is impractical for every module, library, or service to utilize every possible application programming interface. The use of some settings interfaces, for example, those providing encryption or hardware protection, can also require different skills as compared to those that are required for a particular module.

As such, according to various examples, an application settings module is described herein that provides a uniform access mechanism that can be applied to all types of settings. More specifically, the application settings module can include a uniform consumer interface for reading and writing access to settings and associated values, implementing settings storage and related behaviors, registering and observing information that is subject to change, and posting notifications relating to changed information. The application settings module makes settings available using one or more keypaths, and can include a schema where mappings between consumer and provider interfaces can be configured by a developer or other individual. Also, the application settings module can include metadata value storage, which can be accessible through a consumer interface and a provider interface.

For instance, to obtain identity settings on a client device, a developer can invoke an identity keypath, such as "identity.username" which returns a username associated with the client device or "identity.service.type" which returns a service type of the client device. In another example, to obtain security settings of a client device, a developer can invoke "security.passcode.required" or "security.passcode.minimum-length" to identify passcode requirements associated with a client device. Previously, the developer would be required to invoke different types of application programming interfaces to obtain access to these settings from different storage locations on a device.

Accordingly, a system for providing a uniform access interface to access device data is described that includes a client device having program instructions that, when executed, direct the client device to access a definition of a plurality of keypaths from at least one schema file. Some of the keypaths can be defined in association with an application programming interface and others of the keypaths can be defined in association with a device setting. When one of the keypaths is used in source code of a client application, the client device can invoke a service call of the application programming interface as defined in the at least one schema file and return a result of the service call. Alternatively, when one of the keypaths is used in the source code of the client application, the client device can retrieve and return the device setting defined in the at least one schema file.

The service call of the application programming interface can include one that is invoked to read, write, or observe a data object from a data store residing in memory. The data store can include at least one of a database, a flat file database, an operating system keychain, a network storage service, or other service. In some examples, the at least one schema file is one or more configurable schema files generated by a schema manager instance. Further, in some examples, the device setting defined in the configurable schema is retrieved and returned by matching the keypath to a keypath node in the at least one configurable schema file having a longest common prefix and invoking a plurality of service calls in the keypath node with at least one specified option identified in the at least one configurable schema file.

The schema manager instance can be configured to determine a sequence of execution of a plurality of service calls of the application programming interface, the service call being one of the plurality of service calls or defer execution of at least one of the service calls until a predetermined condition is met.

With reference to FIG. 1, an example of a networked environment 100 is shown. The networked environment 100 can include a computing environment 103 executing a management service 106 and network data storage services 109, and client devices 112 in communication through a network 115. The network 115 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 115 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 115 can also include a combination of two or more networks 115. Examples of networks 115 can include the Internet, intranets, extranets, virtual private networks, and other similar networks.

The computing environment 103 executing the management service 106 and the network data storage service 109 can include a server computer or any other system providing computing capability. While referred to in the singular, the computing environment 103 can include a plurality of computing devices that are arranged in one or more server banks, computer banks, or other arrangements. The computing devices of the computing environment 103 can be located in a single installation or can be distributed among many different geographical locations local and/or remote from the other components.

The computing environment 103 can include a grid computing resource or any other distributed computing arrangement. The computing environment 103 can also include, or be operated as, one or more virtualized computer instances. For purposes of convenience, the computing environment 103 is referred to herein in the singular. The components executed on the computing environment 103 can include the management service 106 and the network data storage service 109, as well as other applications, services, processes, systems, engines, or functionality not discussed in detail herein.

Generally, the management service 106 can manage and oversee the operation of client devices 112, for instance, those enrolled or to be enrolled with the management service 106. In some examples, an organization, such as a company, enterprise, organization, or other entity can operate the management service 106 to manage or oversee the operation of the client devices 112 of its employees, contractors, customers, or other individuals having accounts with the entity. In some examples, various settings and tasks performed by the management service 106 can be defined by administrators of the management service 106.

For example, if the management service 106 is used to oversee client devices 112 of employees of an enterprise, the administrators can include information technology personnel of the organization tasked with overseeing operation of the client devices 112 enrolled with the management service 106. To this end, the management service 106 can provide an administrator console that permits administrators to define policies, compliance rules, and other criteria for a client device 112 to remain in compliance with the management service 106. Additionally, through the administrator console, the administrators can specify configurations of the client devices 112 that can be carried out through interaction with an agent application 121 on each of the client devices 112. Accordingly, the management service 106 can include a unified endpoint management (UEM) service in some examples.

To enroll a client device 112 with the management service, an agent application 121 executable on the client device 112 can generate an enrollment request for transmission to the computing environment 103. Enrollment can include authenticating the client device 112 using login information, such as an email address, username, or password, as well as device information or biometric information, and storing information associated with the client device 112 in a data store 130 as enrolled device data 133. Further, enrollment can include sending a configuration profile 136 to the client device 112 that directs the agent application 121 to configure the client device 112 in accordance with settings specified by the administrator in the administrator console, as defined in the configuration profile 136.

The agent application 121 can include one of several client applications 140 on the client device 112. However, the agent application 121 can vary from other client applications 140 as it has the ability to be registered as a trusted device administrator of the client device 112 through management application programming interfaces (APIs) of an operating system 143, which can provide the agent application 121 with privileges to control operation of various functions of the client device 112 that are otherwise unable to be performed by non-privileged client applications 140. The operating system 143 can include the Android operating system by Google®, the iOS operating system by Apple®, the Windows operating system by Microsoft®, a Linux or Unix type of operating system offered by various software providers, or other type of operating system 143 as can be appreciated. Further, the operating system 143 can include a mobile operating system in some examples.

The agent application 121 can configure a client device 112 in accordance with data provided to the client device 112 for the management service 106, referred to as a configuration profile 136. In some examples, the configuration profile 136 can include an extensible markup language (XML) document, JSON data object, or other similar data that causes the agent application 121 to configure the client device 112 in accordance with settings or other parameters specified therein.

Further, the management service 106 can serve up enterprise data 150, such as email data, calendar data, reminder data, messaging data, document data, as well as other data to individuals on their respective client devices 112. To this end, the management service 106 can be utilized by one or more enterprises, units thereof, or other organizations. The management service 106 can be part of a local network, trusted network, or intranet, which can be separate from the other components of the networked environment 103 in various examples.

The computing environment 103 can include a data store 130, which can include any storage device or medium that can contain, store, or maintain the instructions, logic, or applications described herein for use by or in connection with the computing environment 103. The data store 130 can be a hard drive or disk of a host, server computer, or any other system providing storage capability. In some examples, the data store 130 can include a network storage service, for instance, provided by a remote service application programming interface 154. While referred to in the singular, the data store 130 can include a plurality of storage devices that are arranged in one or more hosts, server banks, computer banks, or other arrangements. The data store 130 can include any one of many physical media, such as magnetic, optical, or semiconductor media. Other examples include solid-state drives or flash memory.

The data store 130 can include memory of the computing environment 103, mass storage resources of the computing environment 103, or any other storage resources on which data can be stored by the computing environment 103. The data stored in the data store 130 can include, for example, enrolled device data 133, configuration profiles 136, enterprise data 150, device settings data 153, and other data.

Enrolled device data 138 can include information associated with client devices 112 enrolled, or to be enrolled, with the management service 106. In some examples, enrolled device data 138 can include device profiles periodically generated by the agent application 121. The device profiles describe a current configuration of a client device 112, which can include device settings data 153. For instance, device settings data 153 can include various device settings, such as drivers and applications installed thereon, user preferences, user configurations, device states, and other information associated with a client device 112.

The network data storage service 109 can include a web application, web service, or other network-facing application through which the device settings data 153, or other data, can be retrieved. One or more of the network data storage services 109 can be provided by the same provider or by different providers.

The client device 112 can be representative of one or more client devices 112. The client device 112 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, a voice activated smart device, or any other device with like capability. The client device 112 can include an operating system 143 that performs management functionalities and executes client applications 140. The operating system 143 can be stored in one or more client data stores 175 that also includes the client applications 140, or client data stores 175 separate from the client applications 140 and/or an application settings module 180. The client applications 140 can include the agent application 121, among other applications.

In some examples, the one or more client data stores 175 can include one or more of a database, such as a SQL database or a non-SQL database; a flat file database; an operating system keychain; an array; a linked list; records, tuples, structures (or "structs"); unions; data objects; graphs; binary trees; and so forth.

The client device 112 can be equipped with networking capability or networking interfaces, including a localized networking or communication capability, such as a near-field communication (NFC) capability, radio-frequency identification (RFID) read or write capability, or other localized communication capability. In some embodiments, the client device 112 is mobile where the client device 112 is easily portable from one location to another, such as a smart phone, tablet, or laptop computer, and capable of use during transit. In other situations, the client device 112 can be a desktop machine or a kiosk at a particular location. The client device 112 can include interface devices 177 that can be utilized to interact with users. The interface devices 177 can include, for example, audio devices, displays 178, and haptic devices, such as keyboards, touch screen displays, and other similar devices.

The operating system 143 of the client device 112 can execute various client functionalities or client applications 140, such as the agent application 121, a browser application, a voice interaction functionality, or another application. The operating system 143 and some client applications 140 can access network content served up by the computing environment 103, or other servers and can present this information to a user on a display. For example, the client device 112 can render a user interface 183 on a display 178, such as a liquid crystal display (LCD), organic light emitting diode (OLED) display, touch-screen display, or other type of display device. The client device 112 can also present audio information using the audio device, and can provide haptic or physical feedback using a haptic device.

Some client applications 140 can include a browser or a dedicated application, and a user interface can include a network page, an application screen, or other interface. The client device 112 can also access web applications using a browser application. Further, other client applications 140 can include device management applications, enterprise applications, social networking applications, word processors, spreadsheet applications, media player applications, or other applications.

In some examples, one of the client applications 140 includes the agent application 121 that enrolls the client device 112 with the computing environment 103. The agent application 121 can perform actions as directed by the computing environment 103, for instance, by checking in with the management service 106 or other management service of the computing environment 103, retrieving a command from a command queue, and implementing retrieved commands on the client device 112. In some examples, the management service 106 can send a configuration profile 136 to an operating system 143 of the client device 112 that causes the agent application 121 to obtain administrator privileges on the client device 112.

In some examples, the client device 112 can include an application settings module 180. The application settings module 180 can include code or other computer-implemented logic that provides uniform access to diverse structured information for mobile and other client applications 140. In some examples, the application settings module 180 can include a library, a plug-in, or a software development kit (SDK) that can be included in a client application 140. As such, a developer can invoke functions of the application settings module 180 to retrieve data easily and without having to write code to access, transform, and write data, as will become apparent.

Currently, a developer is required to write calls to a first API to access a first type of data from a first data store and then convert the data into a useable format, while having to write calls to a second API to access a second and different type of data from a second data store, and so forth. Also, the first API and the second API can use different programming languages or return data in one of a variety of formats. For instance, a first API can return data in a JSON data object while a second API can return data as an extensible markup language (XML) data object.

Instead of having to invoke calls to one of a multitude of APIs, some local and some remote, the application settings module 180 provides access to device settings and other data using keypaths 182 whether stored locally or remotely. A keypath 182 includes an alphanumeric string that, when invoked, returns a device setting or other data value. In some examples, a keypath 182 can be formed of a multitude of segments of alphanumeric or other characters separated by predefined values, such as a period.

For instance, the keypath 182 of "identity.service.type," includes a first segment of "identity," a second segment of "service," and a third segment of "type," and the keypath 182 can return a type of service for identity-type settings. Segments can be textual or numeric for supporting an array of settings. In another example, the keypath 182 of "identity.usernamesecurity," includes a first segment of "identity" and a second segment of "usernamesecurity." In another example, the keypath 182 of "security.passcode.required," includes a first segment of "security," a second segment of "passcode," and a third segment of "required." The keypath 182 can return a true or false value on whether a passcode is required, where the keypath 182 relates to identity-type settings. Other examples of keypaths 182 are shown in FIG. 1.

In the keypath 182 of "com.workspaceone.passcode.minimum-password-length," the segments include "com," "workspaceone," "passcode," and "minimum-password-length." Also, the keypath 182 can include numeric segments enclosed in square brackets. For instance, in the keypath 182 of "com.workspaceone.security.domains[11].banned," the segments include "com," "workspaceone," "security," "domains," 11, and "banned."

Accordingly, the application settings module 180 provides a uniform access mechanism that can be applied to all types of settings as well as other type of data. For instance, the application settings module 180 can include a consumer interface 184 for reading, writing, and observing device settings or other data. Within the consumer interface 184, individual settings can be identified using unique keypaths 182. In some examples, the consumer interface 184 is a platform-specific consumer interface. The platform-specific consumer interface includes an API adapted to an existing platform native interface from the application settings module 180. An example of a platform native interface includes SharedPreferences for Android and UserDefaults for iOS, also known as NSUserDefaults. These native interfaces provide access to settings collections in which each individual setting has a name. The names are already compatible with keypaths 182.

Further, the application settings module 180 can be used by a developer to implement settings storage and related behaviors, register and observe information that is subject to change, and generate notifications relating to changed information. For instance, the application settings module 180 can include a provider interface 186 that can be invoked to utilize different types of storage for settings values, and through which different related behaviors can be invoked.

The types of data storage that can be utilized by the application settings module 180 include shared preferences files for Android and other operating systems 143; user defaults or info.plist files for iOS; plain text files containing key-value pairs; JavaScript Object Notation (JSON) format files and data objects; structured query language (SQL) database and database files; remote services accessed by HTTP or other socket-based communication; hardware-backed secure storage on the client device 112, such as Android Keymaster, iOS Keychain, or iOS Secure Enclave; device information and status, some parts of which could be read-only; and/or other data sources.

In some examples, the provider interface 186 can be invoked to count a number of times a particular setting is read; restrict a frequency with which a particular setting may be changed; minimize in-memory time of a password or other sensitive setting value; encrypt and decrypt values with a key from the device high-security module; encrypt and decrypt values with a key from an internal or external accessory or similar second authentication factor; encrypt and decrypt values with a key received through a mobile device management (MDM) service, such as the management service 106; or other similar operation.

In some examples, to make settings or other data available using one or more keypaths 182, the application settings module 180 can include a schema 188 where mappings between the consumer interface 184 and the provider interface 186 can be configured by a developer or other individual. To this end, the schema 188 can include a schema file, such as a JSON data object file or an extensible markup language (XML) file in some examples.

The application settings module 180 can include metadata storage 190, which can be accessible through the consumer interface 184 and the provider interface 186, as will be described. The metadata storage 190 can be used by providers to maintain access counts, access times, and implement other tracking behavior; by providers to store key aliases or other credential references that might be required to implement data protection; and by consumers, for example, to indicate whether an end user is allowed to change a particular value.

Further, the application settings module 180 can include a schema manager 192.

To access a device setting or other data, a developer can invoke the consumer interface 184 and specify a keypath 182 for the setting to read, write, or otherwise observing a setting. More specifically, the developer can invoke a Set( ) function to write data, a Get( ) function to read data, an Observe( ) function to observe data over time, a Notify( ) function to set notifications relating to data, and other functions as will be described. The Set( ) function can be invoked using a keypath 182 and a value, for instance, as Set(keypath, value). The Get( ) function can be invoked using a keypath 182, for instance, as Get(keypath).

The schema 188 can include a plurality of nodes 195 defined by keypaths 182, like settings in the consumer interface 184. In each node 195, there can be an ordered list of providers, each having a list of options. Providers can include classes or methods in a suitable programming language that can be invoked to return a value, such as the setting being retrieved. For the keypath 182 of "identity.service.type," an example of a portion of the schema 188 is produced below:

```
<identity>
   <service>
      <type>
         <provider>
            <name>Provider_1</name>
            <option1>...</option1>
            ...
      </type>
      ...
   </service>
   ...
</identity>
```

To access to a setting through the consumer interface 184, the application settings module 180 can match an keypath 182 to a node 195 for the keypath 182 with the longest common prefix in the schema 188 and invoke each of the providers in the matched node 195 with the specified options.

The provider interface 186 can include can be invoked, according to the specification of the schema 188, to service read and write access initiated from the consumer interface 184. Each invocation of a provider can include various input parameters. In some examples, the input parameters can include type of access, such as read or write; the keypath 182 of the setting being accessed; options from the node 195 in the schema 188; an output of previous providers in the node list, if any, and other parameters.

To service each invocation, a provider can read or write a value in its principal storage; create a value handle that can be used to access the principal storage; implement tracking, control, or other subsidiary behavior; and generate an output. In some examples, the storage of a provider can be one of a multitude of storage mediums, such as a database, flat file, or operating system keychain, such as the iOS keychain. The storage can return, for example, a value obtained by a device information interface. Access to device information, and device state, sometimes requires use of specialized programming interfaces with which typical application developers are unfamiliar. The application settings module 185 enables this specialized code to be wrapped in a provider so that access can be made through the same uniform consumer interface 184.

In another example, a provider can construct, for example, a one-use handle so that a password could be read only once and isn't exposed to all providers in a node 195. Value handles also support asynchronous stores, including remote stores accessed by web services, for example. An example of a behavior could include, for example, updating a count of the number of accesses made to a particular setting. Implementation of a behavior can utilize metadata from the metadata storage 190.

To generate an output, the output can include a value read from the storage, for example. The output can be made available by the application settings module 180 to subsequent providers in a node 195 defined in the schema 188, and to the original user of the consumer interface 184.

The metadata stored in the metadata storage 190 can include data associated with a device setting or other type of data. For instance, a device setting can include a Wi-Fi state and data associated with the device setting can include wireless network identifiers and other data. Similar to device settings, the metadata can be identified by unique keypaths 182 generated by concatenating a common key path prefix that identifies all metadata, such as a name space; the keypath 182 of the associated device setting; and a keypath 182 suffix that is unique among all metadata settings for a particular device setting. The storage of metadata can be specified in the schema 188, as each metadata setting has a unique keypath 182. In other words, the metadata storage 190 is implemented by providers of the application settings module 180 similar to the data storage.

In some examples, a provider may do no more than implement a behavior. In other words, a provider wouldn't return a value, nor a value handle. This enables multiple simple generic providers to be assembled in the schema 188 to meet complex requirements. The schema 188 can be structured like settings data, and accessed through the consumer interface 184.

The following example illustrates a requirement for access to attributes relating to a particular setting, such as metadata. Suppose there is a consumer, the Password Module, that utilizes the keypaths 182 of "secrets.password," "secrets.password.last-modified," and "secrets.password.protection." The "secrets.password" keypath 182 is associated with a method that writes this setting to save a password of a user. The "secrets.password.last-modified" keypath 182 is associated with a method that reads this setting to find out the date of the last change. The "secrets.password.protection" keypath 182 is associated with a method that reads this setting to determine how the stored password is protected as data-at-rest on the client device 112. Suppose there is also a provider, the Secure Storage Module. When invoked to store a value at a key path, the module writes a value, V, with an identifier based on the key path, KP, to the device's hardware-backed secure storage; calls the consumer interface 184 to write data as the current date and time to metadata.KP.last-modified and the value "hardware-backed" to metadata.KP.protection. Suppose there is also another provider, ASM SQL, that stores data generically, in an SQL database on the client device 112.

The schema 188 could be configured as follows. The "secrets" keypath 182 can be provided by an adaptor, ADAP, that maps the rest of the path where a single-segment suffix, SEG, is mapped to "secure. SEG" and any other suffix, SUFF, is mapped to "metadata.secrets.SUFF." The "secure" keypath 182 is provided by the Secure Storage Module, above. The "metadata" keypath 182 is provided by the SQL database of the application settings module 180. This meets the requirements, for example as follows. When the Password Module writes a password, PWD, to the "secrets.password" keypath 182, the adapter ADAP is invoked and maps the keypath 182 to "secure.password", the Secure Storage Module stores the password in the hardware-backed store, and the Secure Storage Module writes the metadata values to "metadata.secure.password.last-modified" keypath 182 and "metadata.secure.password.protection" keypath 182. Thereafter, the SQL database of the application settings module 180 is invoked and the metadata is stored in a database on the client device 112. When the Password Module reads from the "secrets.password.protection" keypath 182, the adaptor ADAP is invoked which maps the path to "metadata.secrets.password.protection." The SQL database of the application settings module 180 is invoked and the data is retrieved from a database on the client device 112. Note that adaptation has enabled the metadata for a setting to be stored in a different location to the value, but accessed by a path that is adjacent.

The schema manager 192 can include code that configures the schema 188. In some examples, the schema manager 188 is part of the application code. As such, there can be a single schema manager instance, and therefore a single schema 188 (or schema file), in a client application 140. Further, the schema manager 192 can specify a sequence of providers that will service which keypaths 182 in the schema 188. The schema manager 192 can initialize and launch a sequence of consumers and providers. For example, particular consumers may depend on particular providers or on default values being in place prior to their launch.

The launch of a consumer or provider may be deferred until a condition is met. For example, a password setting user interface will not be opened if password policies have not yet been retrieved from a management console. In further examples, the schema manager 192 can oversee the resolution of differences between consumer requirements and provider capabilities, including for example, de-blocking; locking adaptor configurations, if required; polling for changed values in case a consumer observes changes to a value whose provider doesn't support notification; and other similar tasks. The schema manager 192 can further ensure there are no collisions between consumer keypaths 182 and configure adaptations between different consumers that read or write the same data but in different structures.

In further examples, the application settings module 180 can handle synchronous and asynchronous processing of data. An immediate setting can include a setting whose value is either required by a consumer immediately, or can be made available by a provider immediately. As such, an immediate setting for a consumer could be a value that, for example, appears in the user interface 179 or changes the user interface, for example by making a field read only. An immediate setting for a provider could be one that is, for example, read from a flat file on the client device 112 or read from a database on the client device 112. Immediate setting access can fail, but will fail immediately.

An asynchronous setting can refer to a setting whose value either isn't required immediately by a consumer, or whose value can't be made available immediately by a provider. An asynchronous setting could be made available to a consumer using an invocation of a callback in the consumer or a return of a future or promise type of object, accessing the value of which could block in the consumer. An asynchronous setting could be provided a remote server or service accessed by HTTP, for example. Alternatively, an asynchronous setting can be provided from a local store that requires biometric or other authentication of the end user. Asynchronous setting access can fail. Failure can be indicated by invocation of a different callback, or an exception from the future or promise, for example.

The application settings module 180 can guarantee that an individual setting will either succeed or fail, i.e. a setting won't succeed and then fail. Further the application settings module 180 can handle setting change notification, where a notification can be dispatched to the consumer of a setting notifying the consumer that its value has been changed, other than by the consumer. The receipt of change notifications can be optional for consumers.

In some examples, a setting change notification originates in a provider if the underlying storage itself is observable for changing values. If the underlying storage isn't observable, then polling can be used. In any case, the application settings module 180 mediates between the dispatchers and observers of notifications.

Figure 2:
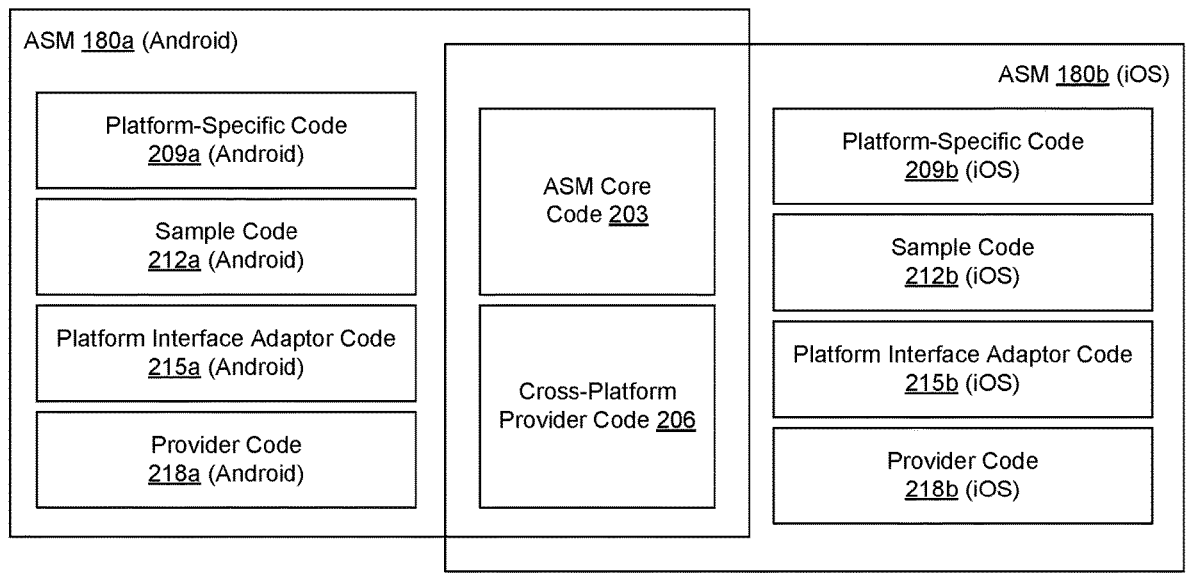
FIG. 2 is a schematic diagram illustrating an example of the application settings module of FIG. 1 in a first type of operating system and a second type of operating system.

Turning now to FIG. 2, a schematic diagram 200 illustrating an example of the application settings module 180 is shown with reference to a first type of operating system 143 and a second type of operating system 143. The first type of operating system 143 can include Android OS, for example, and the second type of operating system 143 can include iOS, although other types of operating systems 143 can be employed.

The application settings module 180 can include application settings module core code 203 and cross-platform provider code 206. In some examples, the application settings module core code 203 does not include providers, nor sample code. As such, the application settings module core code 203 is platform independent and can be written in a suitable programming language, such as the C++ programming language. The cross-platform provider code 206 that is part of the application settings module 180, while not being core code 203, sample code, or a basic provider.

With reference to the first operating system 143*a* (e.g., Android), the application settings module 180*a* for the Android OS can include a library or other package that can be used by Android OS developers. The package can include or be based on the application settings module core code 203 as well as platform-specific code 209*a* (e.g., Android code) to present an application programming interface in the Kotlin programming language. In addition, the package can include sample code 212*a*, platform interface adaptor code 215*a*, and provider code 218*a*.

Similarly, with reference to the second operating system 143*b* (e.g., iOS), the application settings module 180*a* for iOS can include a library or other package that can be used by iOS developers. The package will include or be based on the application settings module core code 203 as well as platform-specific code 209*b* (e.g., iOS code) to present an application programming interface in the Swift programming language. In addition, the package can include sample code 212*b*, platform interface adaptor code 215*b*, and provider code 218*b*.

Figure 3:
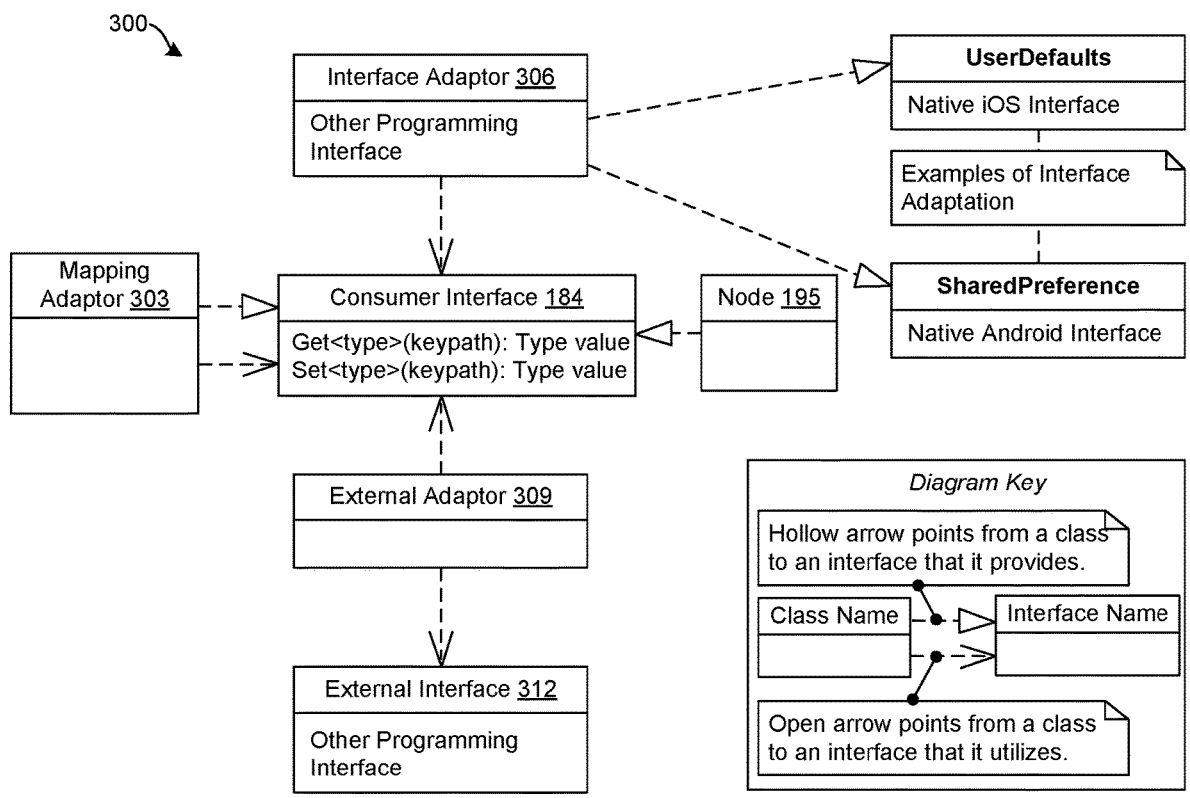
FIG. 3 is a unified modeling language (UML) class diagram for the application settings module of FIG. 1.

Referring next to FIG. 3, a unified modeling language (UML) class diagram 300 for the application settings module 180 is shown according to various examples. The application settings module 180 can include various interfaces and adaptors, such as a consumer interface 184, a mapping adaptor 303, an interface adaptor 306, an external adaptor 309, an external interface 312, as well as other interfaces and adaptors.

The external adaptor 309 can include code that makes data from outside the application settings module 180 available as settings and values within the application settings module 180. In some examples, the external adaptor 309 can perform retrieval and presentation of data. Retrieval can include, for example, retrieving data from a remote service, such as the network data storage service 109 through a remote service API 154, retrieving settings from a management console, calling native APIs to obtain device information, and similar retrieval operations. Retrieval can include performing authentication, for instance, by sending or retrieving authentication tokens or other security credentials. As such, in some examples, security credentials can be stored and retrieved by the application settings module using a consumer interface 184.

The presentation of data by the external adaptor 309 can include, for example, writing retrieved data into a structured settings representation by calling a consumer interface 184, providing the retrieved data in a structured settings representation by implementing a provider interface 186, or similar presentation operation.

The interface adaptor 306 can include code that adapts between a consumer interface for a platform (e.g., Android or iOS) and the consumer interface 184 of the application settings module 180. In some examples, the interface adaptor 306 can make minimal changes to keypaths 182 and accept any keypath 182 by not restricting scope of a keypath 182 to a known structure.

The mapping adaptor 303 can include code that makes settings that are available within the application settings module 180 at one keypath structure available under another keypath structure. As can be appreciated, mapping requirements can range from simple to complex.

In further examples, the application settings module 180 can include a de-blocking adaptor, a locking adaptor, and a precision adaptor. The de-blocking adaptor can include code that resolves immediate and asynchronous access conflicts, for example, by implementing a default-cache-notify approach. The locking adaptor can include code that implements locking if locking is required on settings whose storage provider does not support locking. The locking adaptor can include a provider configurable in the schema by the schema manager. In some examples, the locking adaptor can implement locking by setting and clearing flags stored in metadata or in locations other than where data actually resides.

The precision adaptor can include code that copies a higher precision representation of a value, and passes on a lower precision representation to a subsequent provider. To this end, the precision adaptor can be invoked when a storage provider supports most data types, including single-precision floating point values without supporting double-precision floating-point values. The precision adaptor supports best-effort storage transparency. The eventual storage location of the subsequent provider would still contain, in the example above, a floating-point number.

Further, in some examples, the application settings module 180 can include a custom data type adaptor, which includes code that enables handling of custom data types that are not supported by the application settings module 180. To handle custom data types, the custom data type adaptor can perform "parcelization" on Android, coding on iOS, or similar operations on same or other operating systems 143. For instance, parcelization on Android can include using a "Parcel," which is an optimized serialization format for Android that enables the transfer of data between processes. As such, the custom data type adaptor can handle custom data types at a time when a data type is known by transposing data to a safe representation, such as a byte array, NSData instance, or base 64 encoded string; attaching a reference to a class object for the data; storing a class reference as encapsulated with the safe representation or as metadata; and, when required, deserializing the safe representation as an instance of the class.

Figure 4:
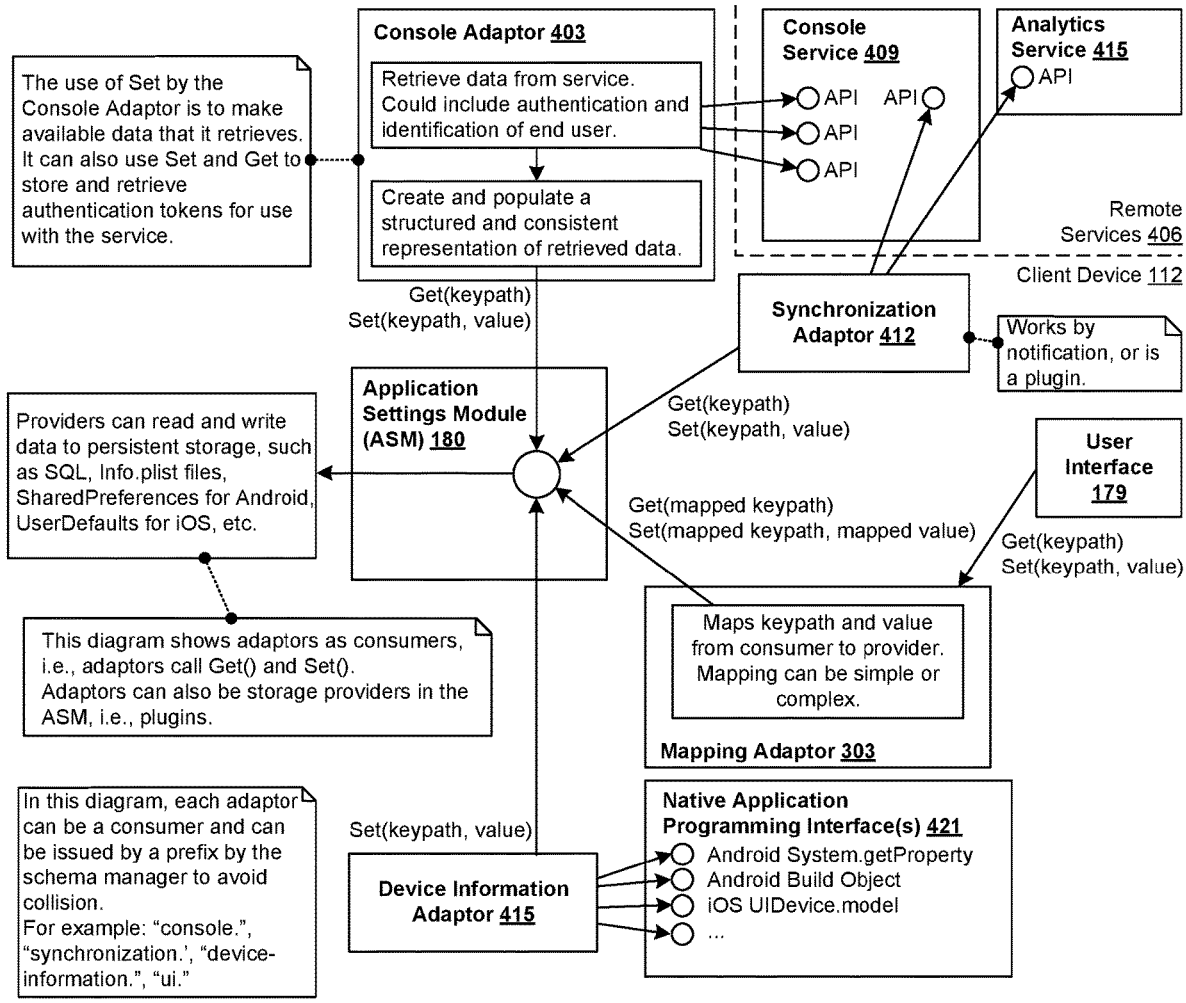
FIG. 4 is a schematic diagram illustrating an example of a client application utilizing diverse data sources both on and off the client device utilizing the application settings module of FIG. 1.

Moving on to FIG. 4, a schematic diagram 400 is shown illustrating an example of a client application 140 comprising the application settings module 180 that utilizes diverse data sources both on and off the client device 112. To begin, the client application 140 can include a console adaptor 403 that comprises code that retrieves data from various remote services 406, such as the network data storage service 109 of the computing environment 103. For instance, the console adaptor 403 can interact with a console service 409 located remotely from the client device 112 using one or more application programming interfaces to retrieve data from a remotely-located data store. The console adaptor 403 can further create and populate a structured and consistent representation of data retrieved by the console adaptor 403 such that the data can be utilized by various applications and services of the client device 112 using the application settings module 180 and/or one or more keypaths 182.

To this end, the console adaptor 403 can invoke the Get(keypath) or Set(keypath, value) functions to retrieve settings or store settings, respectively. More specifically, the use of the Set( ) function by the console adaptor 403 can make data retrieved by the console adaptor 403 available for use by other modules of the client application 140 or by other applications or services on the client device 112 through use of one or more keypaths 182. Further, the console adaptor 403 can perform authentication, if needed, to retrieve data, and store and retrieve authentications tokens required by remote services 406.

The client application 140 can further include a synchronization adaptor 412. The synchronization adaptor 412 can synchronize data stored on a remote service 406 with settings maintained by the application settings module 180 locally on the client device 112. For instance, if a value of data in a remote service 406 changes, the synchronization adaptor 412 can notify the application settings module 180 to update the setting locally on the client device 112. In one example, the client device 112 can interact with an analytics service 415 to using a remote service API to obtain various analytics associated with operation of the client device 112. As such, the synchronization adaptor 412 can operate as a notification service, notifying the application settings module 180 when a data value has changed on a remote service 406, or as a plugin that can be invoked locally on the client device 112.

Similar to the console adaptor 403, the synchronization adaptor 412 can interact with the console service 409, the analytics service 415, or other service located remotely from the client device 112 using one or more application programming interfaces to retrieve data from a remotely-located data store. The console adaptor 403 can further create and populate a structured and consistent representation of data retrieved by the console adaptor 403 such that the data can be utilized by various applications and services of the client device 112 using the application settings module 180 and/or one or more keypaths 182.

The client application can further utilize the mapping adaptor 303 as well as a device information adaptor 418. The mapping adaptor 303 can receive a definition of a keypath 182 and a corresponding value by a user interface 179, and make the value available as a setting retrievable by application settings module 180. The keypath 182 and a corresponding value can be defined by a user using the user interface 179, as can be appreciated. Further, the mapping adaptor 303 can make one keypath 182 available under another keypath 182. As can be appreciated, mapping requirements can range from simple to complex.

Similar to the console adaptor 403 and the synchronization adaptor 412, the device information adaptor 418 can include code that retrieves data. However, the device information adaptor 418 can retrieve data locally as opposed to remotely. For instance, the device information adaptor 418 can utilize one or more native application programming interfaces 421 of a client device 112 to retrieve data from a local data store. The data can include device settings, device preferences, as well as other data. The console adaptor 403 can further create and populate a structured and consistent representation of data retrieved by the console adaptor 403 such that the data can be utilized by various applications and services of the client device 112 using the application settings module 180 and/or one or more keypaths 182.

Figure 5:
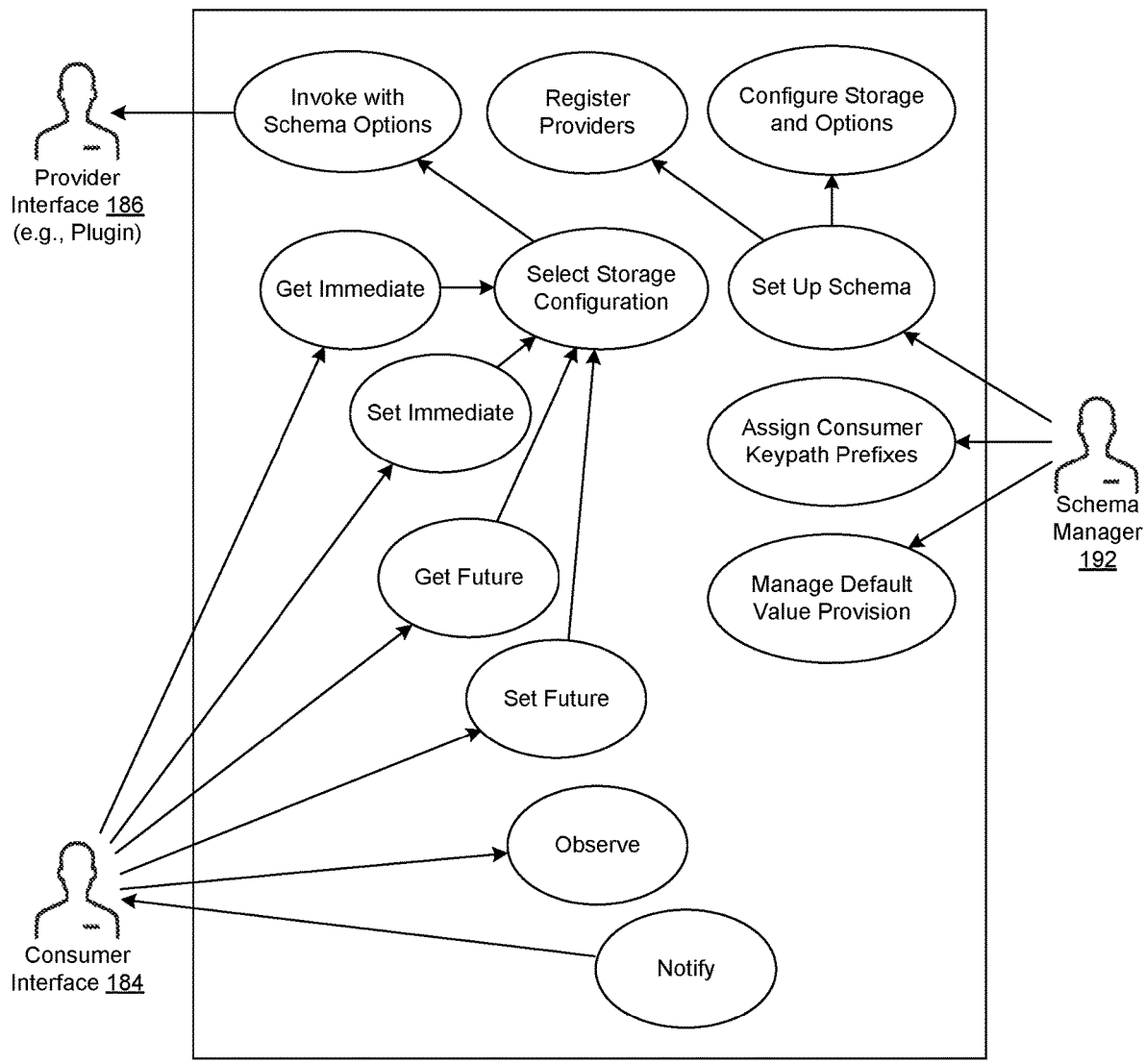
FIG. 5 is a UML programming interface diagram showing an example use case of the application settings module of FIG. 1.

Referring next to FIG. 5, a UML programming interface diagram 500 is shown that illustrates an example use case of the application settings module 180 of FIG. 1. More specifically, the application settings module 180 can include one or more methods that can be invoked by a developer of a client application. For instance, the methods can include a Get( ) method, a Set( ) method, a Get Future( ) method, a Set Future( ) method, an Observe( ) method, a Notify( ) method, as well as other methods.

The Get( ) method can include a function of the consumer interface 184 through which a setting value is read, where the setting is accessed by a keypath 182. In other words, the Get( ) method can be invoked for immediate access to a setting. In some examples, the Get( ) method can fail, in which case an exception can be raised. In generic code, the Get( ) method can be invoked as follows:
  value=read(keypath)
  value=read<Type>(keypath)

The Set( ) method can include a function of the consumer interface 184 through which a setting value is written to memory, where the setting is specified by a keypath 182. The Set( ) method can be invoked for immediate access to memory and can fail, in which case an exception can be raised. In generic code, the Set( ) method can be invoked as follows:
  set(keypath, value)
  set<Type>(keypath, value)

The Get Future( ) method can operate similar to the Get ( ) method described above, but instead handles asynchronous access of a setting. The Get Future( ) method can fail, in which case an error callback can be invoked or an exception can be raised by accessing the returned object depending on the platform and programming language features. In generic code, the Get Future( ) method can be invoked as follows:
  okCallback(value) { }
  failCallback(exception) { }
  readFuture(keypath, okCallback, failCallback)
  readFuture<Type>(keypath, okCallback, failCallback)
  future=readFuture(keypath)
  future=readFuture<Type>(keypath)
  value=future( )

The Set Future( ) function can operate similar to the Set ( ) method described above, but instead handles asynchronous access of a setting. The write operation can fail, in which case an error callback can be invoked or an exception can be raised by accessing the returned object, depending on the platform and programming language features. In generic code, the Set Future( ) method can be invoked as follows:
  okCallback( ) { }
  failCallback(exception) { }
  writeFuture(keypath, value, okCallback, failCallback)
  writeFuture<Type>(keypath, value, okCallback, failCallback)
  future=writeFuture(keypath, value)
  future=writeFuture<Type>(keypath, value)
  ok=future( )

A point defined by a keypath 182 within a schema 188 can be referred to as a node. A node can represent an object at which some programming interfaces of the application settings module 180 can be offered. For instance, in generic code, a node can be utilized as follows:

node=Node("configuration")
  valueA=node.readInt("a")
  valueB=node.readString("b")
  // Above is equivalent to the below.
  valueA=readInt("configuration.a")
  valueB=readString("configuration.b")

The application settings module 180 can support various data types directly, such as a string comprising alphanumeric or similar text; an integer; a single-precision floating point number, such as a float; a double-precision floating point number, such as a double; a date and time; a Boolean; and other data formats, such as a byte. An hierarchy of the application settings module 180 can supports various types of data storage and collection, such as "numbered" where an array is utilized, and "named," where a dictionary is utilized.

Figure 6:
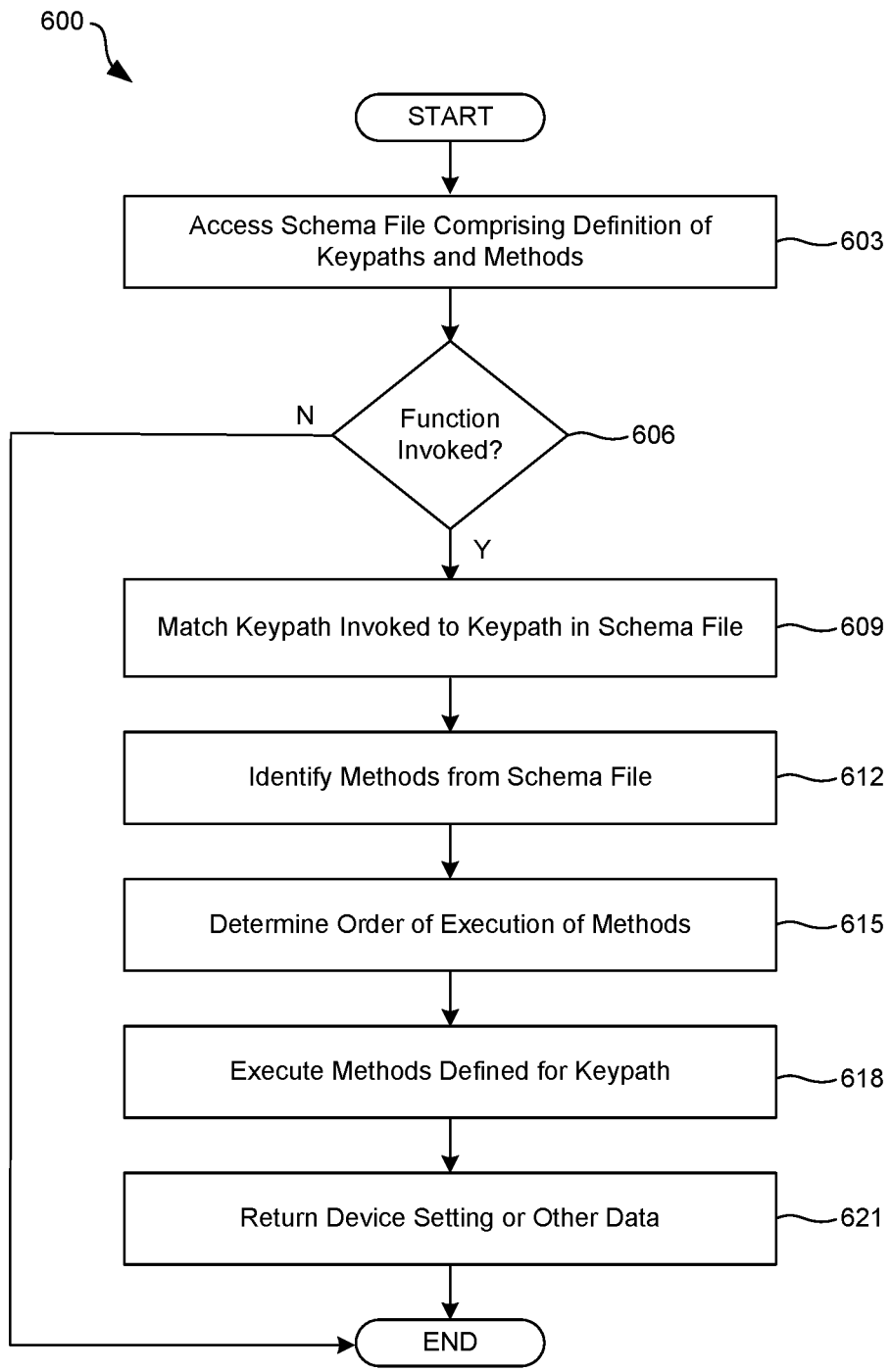
FIG. 6 is a drawing illustrating functionality implemented by the application settings module or the client device of FIG. 1.

FIG. 6 is a drawing illustrating functionality implemented by the application settings module or the client device of FIG. 1.

Begging with step 603, the client device 112 can access a schema 188, such as a schema file, comprising a definition of keypaths 182 and providers, also referred to as methods. The providers or methods include code that is to be executed to return a device setting or other value when a keypath 182 is used to retrieve a device setting or other data. For instance, the schema 188 can include nodes 195 defined by keypaths 182. In each node 195, there can be an ordered list of providers, or methods, each having a list of options. The methods can be defined in a suitable programming language that, when executed, return a value, such as the setting being retrieved as will be described.

In step 606, the client device 112 can determine whether a function has been invoked. The function can include one that utilizes a keypath 182, such as the Set( ) function or the Get( ) function. In other examples, the function can include an observe function, Observe( ), a notify function, Notify( ) the Get Immediate function, the Get Future function, the Set Immediate function, the Set Future function, or other suitable function that utilizes a keypath 182. If a function has not been invoked, the process can proceed to completion.

However, if the client device 112 identifies the invocation of a function that utilizes the keypath 182, the process can proceed to step 609. In step 609, the client device 112 can match the keypath 182 as a parameter of the function invoked in step 606 with a corresponding keypath 182 defined in the schema 188. For instance, if the keypath 182 includes "console.identity.username," the nodes 195 corresponding to this keypath 182 are identified in the schema 188 using the one or more segments of the keypath 182.

To process resolution of a keypath 182 for a read, write, or other call from the consumer interface 184, the application settings module 180 can compare the keypaths 182 in the schema storage configurations to the keypath 182 received from the consumer. The storage configuration path having the longest prefix of whole segments in common with the consumer keypath 182 can be selected. The key path resolution can include the list of provider specifications from a specified storage configuration.

In some examples, the comparison of keypaths 182 is based on whole segments. For example, the common prefix of the key paths "infrastructure.routing" and "infrastructure.route" would be "infrastructure", not "infrastructure.rout." Also, in some examples, storage configurations are not inherited. For example, suppose there are two storage configurations, the first having the keypath 182 of "infrastructure" and the second having the keypath 182 of "infrastructure.routing." The key path resolution for "infrastructure.routing.wireless" is based on the second storage configuration only, while the first is ignored.

Thereafter, in step 612, the providers, or methods, defined in the nodes 195 are identified from the schema 188. For instance, for each node 195 of the schema 188, there can be an ordered list of methods, each having a list of options. The methods are identified from corresponding nodes 195 or other portion of the schema 188.

Next, in step 615, the client device 112 can determine an order of execution of the methods identified in step 612. In some examples, the client device 112 can use the order of the methods defined in the schema 188 as the order of execution. For instance, the schema manager 192 can initialize a sequence of consumers and providers, such as methods, depending on whether particular consumers depend on particular providers or on default values being in place prior to their launch. Alternatively, the client device 112 can defer the launch of a consumer or provider can be until a predetermined condition is met. For example, a password setting user interface might not be opened if password policies have not yet been retrieved from a management console.

Next, in step 618, the methods, such as consumers or providers, are executed in accordance with the order determined in step 615. As can be appreciated, the methods can include those that obtain and return a device setting. For instance, a method can read or write a value in its principal storage; create a value handle that can be used to access the principal storage; implement tracking, control, or other subsidiary behavior; and generate an output. In some examples, the storage of a provider can be one of a multitude of storage mediums, such as a database, flat file, or operating system keychain, such as the iOS keychain. As such, the methods executed in step 618 can return, for example, a value obtained by a device information interface. Access to device information, and device state, sometimes requires use of specialized programming interfaces with which typical application developers are unfamiliar. The application settings module 185 enables this specialized code to be wrapped in a method so that access can be made through the same uniform consumer interface 184.

Finally, in step 621, the client device 112 can return a device setting or other data to a requesting process. In some examples, the client device 112 returns a future or promise type of data object, that promises that data at a time in the future. Thereafter, the process can proceed to completion.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 112 can include a display upon which a user interface 179 generated by a client application 140, management service 106, or another application can be rendered. In some examples, the user interface 179 can be generated with user interface data provided by the computing environment 103. The client devices 112 can also include one or more input/output devices that can include, for example, a capacitive touchscreen or other type of touch input device, fingerprint reader, or keyboard.

Although the management service 106, the network data storage service 109, client applications 140, the application settings module 180, and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of technologies. These technologies can include discrete logic circuits having logic gates for implementing various logic functions upon an application of one or more data signals, application specific integrated circuits having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system. The computer-readable medium can include any one of many physical media, such as magnetic, optical, or semiconductor media. Examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system for providing a uniform access interface to access device data, comprising:
   a client device; and
   program instructions stored in memory and executable by the client device that, when executed, direct the client device to:
      access a schema file comprising a definition of a plurality of keypaths, wherein the keypaths are defined in the schema file in association with a plurality of methods, a first portion of the keypaths correspond to one of a plurality of device settings, and a second portion of the keypaths correspond to remote data retrieved through a remote service application programming interface;
      identify a first function invoked using a first one of the keypaths in the first portion to read or write a first one of the device settings;
      in response to the first function being invoked from a first application of the client device, match a keypath as a parameter of the first function to a first one of the keypaths in the first portion based at least in part on the keypath and the first one of the keypaths having a longest common prefix of at least one whole segment;
      determine an order of execution of a portion of the methods corresponding to the first one of the keypaths in the schema file that interacts with the first one of the device settings;
      execute, based at least in part on the order of execution, a portion of the methods corresponding to the first one of the keypaths in the schema file that interacts with the first one of the device settings, and return a result to a requesting process;
      identify a second function invoked from a second application of the client device using a second one of the keypaths in the second portion to read a second one of the device settings from a remote console service using the remote service application programming interface;
      in response to the second function being invoked from the second application, execute a portion of the methods corresponding to the second one of the keypaths in the schema file that invokes a service call through the remote service application programming interface to receive a value of the second one of the device settings from the remote console service;
      convert the value of the second one of the device settings to be compatible with a third application using a mapping adaptor; and
      cause a converted value of the second one of the device settings to be available to a third application of the client device using a third one of the plurality of keypaths.

2. The system of claim 1, wherein:
   the schema file is at least one configurable schema file; and
   the at least one configurable schema file is generated by a schema manager instance.

3. The system of claim 2, wherein the device setting defined in the at least one configurable schema is retrieved and returned by:
   invoking the portion of the methods as identified in a corresponding keypath node with at least one specified option identified in the at least one configurable schema file.

4. The system of claim 2, wherein the schema manager instance is configured to:
   defer execution of at least one of the methods in the portion until a predetermined condition is met.

5. The system of claim 1, wherein the service call of the uniform access interface is invoked to read, write, or observe the device setting from a data store residing in memory.

6. The system of claim 5, wherein the data store comprises at least one of: a database, a flat file database, an operating system keychain, and a network data storage service located remotely from the client device.

7. The system of claim 1, wherein individual ones of the plurality of keypaths comprise a plurality of alphanumeric segments separated by a predefined value.

8. A computer-implemented method, comprising:
   accessing a schema file comprising a definition of a plurality of keypaths, wherein the keypaths are defined in the schema file in association with a plurality of methods, a first portion of the keypaths correspond to one of a plurality of device settings, and a second portion of the keypaths correspond to remote data retrieved through a remote service application programming interface;
   identifying a first function invoked to read or write a first one of the device settings;
   in response to the first function being invoked from a first application of the client device, matching a keypath as a parameter of the first function to a first one of the keypaths in the first portion based at least in part on the keypath and the first one of the keypaths having a longest common prefix of at least one whole segment;
   determining an order of execution of a portion of the methods corresponding to the first one of the keypaths in the schema file that interacts with the first one of the device settings;
   executing, based at least in part on the order of execution, a portion of the methods corresponding to the first one of the keypaths in the schema file that interacts with the first one of the device settings, and return a result to a requesting process;
   identifying a second function invoked from a second application of the client device using a second one of the keypaths in the second portion to read a second one of the device settings from a remote console service using the remote service application programming interface;

in response to the second function being invoked from the second application, executing a portion of the methods corresponding to the second one of the keypaths in the schema file that invokes a service call through the remote service application programming interface to receive a value of the second one of the device settings from the remote console service;

convert the value of the second one of the device settings to be compatible with a third application using a mapping adaptor; and causing a converted value of the second one of the device settings to become available to a third application of the client device using a third one of the plurality of keypaths.

9. The computer-implemented method of claim 8, wherein:

the schema file is at least one configurable schema file; and the at least one configurable schema file is generated by a schema manager instance.

10. The computer-implemented method of claim 9, wherein the device setting defined in the at least one configurable schema is retrieved and returned by:

invoking the portion of the methods as identified in a corresponding keypath node with at least one specified option identified in the at least one configurable schema file.

11. The computer-implemented method of claim 9, wherein the schema manager instance is configured to:

defer execution of at least one of the methods in the portion until a predetermined condition is met.

12. The computer-implemented method of claim 8, wherein the service call of the uniform access interface is invoked to read, write, or observe the device setting from a data store residing in memory.

13. The computer-implemented method of claim 12, wherein the data store comprises at least one of: a database, a flat file database, an operating system keychain, and a network data storage service located remotely from the client device.

14. The computer-implemented method of claim 8, wherein individual ones of the plurality of keypaths comprise a plurality of alphanumeric segments separated by a predefined value.

15. A non-transitory computer-readable medium comprising program instructions stored thereon executable in a client device that, when executed, direct the client device to:

access a schema file comprising a definition of a plurality of keypaths, wherein the keypaths are defined in the schema file in association with a plurality of methods, a first portion of the keypaths correspond to one of a plurality of device settings, and a second portion of the keypaths correspond to remote data retrieved through a remote service application programming interface;

identify a first function invoked to read or write a first one of the device settings;

in response to the first function being invoked from a first application of the client device, matching a keypath as a parameter of the first function to a first one of the keypaths in the first portion based at least in part on the keypath and the first one of the keypaths having a longest common prefix of at least one whole segment;

determine an order of execution of a portion of the methods corresponding to the first one of the keypaths in the schema file that interacts with the first one of the device settings;

execute, based at least in part on the order of execution, a portion of the methods corresponding to the first one of the keypaths in the schema file that interacts with the first one of the device settings, and return a result to a requesting process;

identify a second function invoked from a second application of the client device using a second one of the keypaths in the second portion to read or write data using the remote service application programming interface;

in response to the second function being invoked from the second application, execute a portion of the methods corresponding to the second one of the keypaths in the schema file that invokes a service call through the remote service application programming interface to receive a value of the second one of the service settings from the remote console service;

convert the value of the second one of the device settings to be compatible with a third application using a mapping adaptor; and cause a converted value of the second one of the device settings to become available to a third application of the client device using a third one of the plurality of keypaths.

16. The non-transitory computer-readable medium of claim 15, wherein:

the schema file is at least one configurable schema file; and the at least one configurable schema file is generated by a schema manager instance.

17. The non-transitory computer-readable medium of claim 16, wherein:

the device setting defined in the at least one configurable schema is retrieved and returned by:

invoking the portion of the methods as identified in a corresponding keypath node with at least one specified option identified in the at least one configurable schema file; and the schema manager instance is configured to:

defer execution of at least one of the methods in the portion until a predetermined condition is met.

18. The non-transitory computer-readable medium of claim 15, wherein the service call of the uniform access interface is invoked to read, write, or observe the device setting from a data store residing in memory.

19. The non-transitory computer-readable medium of claim 18, wherein the data store comprises at least one of: a database, a flat file database, an operating system keychain, and a network data storage service located remotely from the client device.

20. The non-transitory computer-readable medium of claim 15, wherein individual ones of the plurality of keypaths comprise a plurality of alphanumeric segments separated by a predefined value.

* * * * *